United States Patent
Barry et al.

[11] 3,975,693
[45] Aug. 17, 1976

[54] DUAL FUNCTION LASER FOR SPACE LASER COMMUNICATIONS

[75] Inventors: James D. Barry, Fairborn; Paul M. Freedman, WPAFB, both of Ohio

[73] Assignee: The United States of America as represented by the Secretary of the Air Force, Washington, D.C.

[22] Filed: Mar. 10, 1975

[21] Appl. No.: 556,989

[52] U.S. Cl. .................. 331/94.5 C; 331/94.5 N
[51] Int. Cl.² .................................. H01S 3/081
[58] Field of Search .......................... 331/94.5

[56] References Cited
UNITED STATES PATENTS
3,735,280  5/1973  Johnston, Jr. .................. 331/94.5 F Primary Examiner—William L. Sikes
Attorney, Agent, or Firm—Joseph E. Rusz; Robert Kern Duncan

[57] ABSTRACT

A Nd:YAG laser operating in a dual functioning cavity with a $Ba_2Na(NbO_3)_5$ frequency doubling crystal provides two frequencies of laser radiation, one frequency double the other, to provide a laser beacon beam at a wavelength of approximately 1.06 micrometers and a high data rate beam at a wavelength of approximately 0.53 micrometer.

1 Claim, 4 Drawing Figures

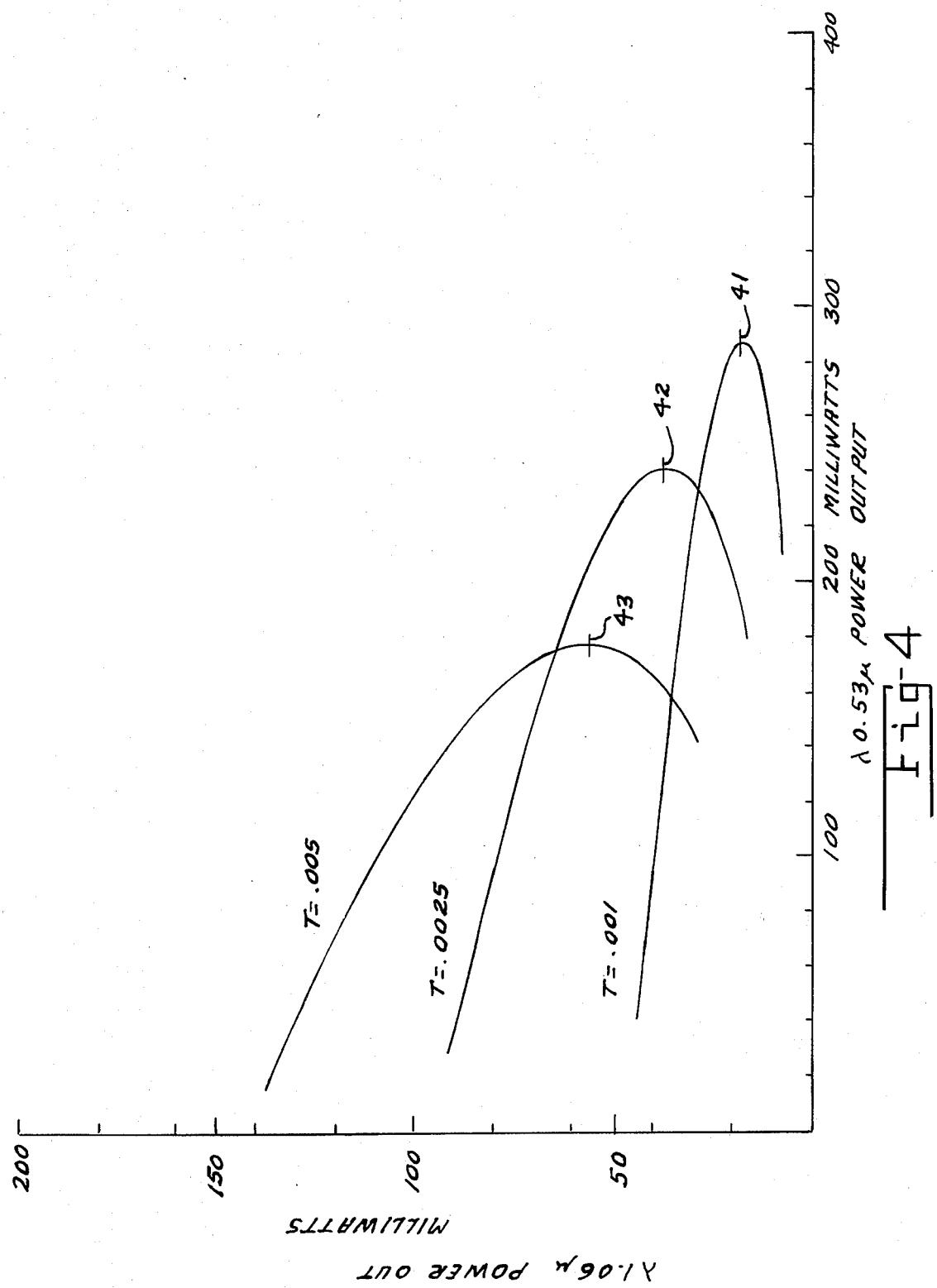

DUAL FUNCTION LASER FOR SPACE LASER COMMUNICATIONS

RIGHTS OF THE GOVERNMENT

The invention described herein may be manufactured and used by or for the Government of the United States for all governmental purposes without the payment of any royalty.

BACKGROUND OF THE INVENTION

The field of the invention is in the art of space communications and data handling.

Prior art systems have required two laser sources, one for each wavelength of transmission, each with its associated thermal, electrical, and mechanical systems.

SUMMARY OF THE INVENTION

A dual function laser system particularly suited for space laser communication systems provides two wavelengths of radiation from a single lasing source.

None of the individual components of the disclosed system are individually unique, nor are they critical as to their individual composition with respect to this invention. The invention disclosed comprises the unique combination of well known elements to provide for the efficient generation from a single lasing medium of two simultaneous beams of radiation at different frequencies, each beam having the characteristics of a conventional laser beam and each beam being independently utilizable for the transmission of intelligence.

BRIEF DESCRIPTION OF THE DRAWING

FIG. 3 is a representative plot showing the relationships of the lower frequency power output with respect to the intracavity circulation low frequency power for representative values of transmission of the low frequency output mirror; and FIG. 4 is a representative plot showing the high frequency and low frequency output powers for representative values of transmission of the low frequency output mirror.

DESCRIPTION OF THE PREFERRED EMBODIMENT

Figure 1:
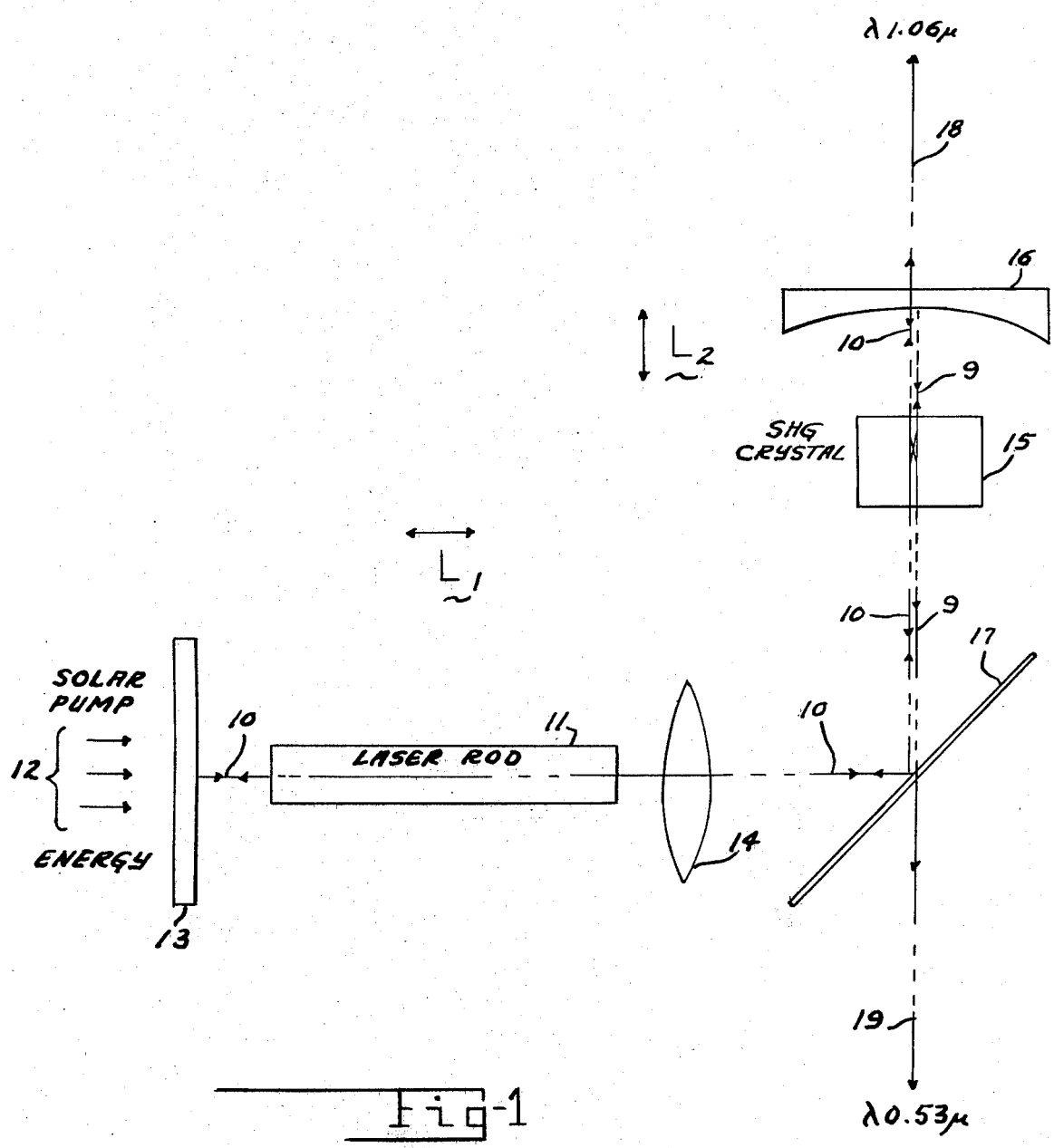
FIG. 1 is a schematic diagram of a typical embodiment of the invention for providing two wavelengths of radiation from a single laser rod.

A dual function laser system for space laser communications providing two wavelengths of emission from a Nd:YAG laser with intracavity frequency doubling is shown schematically in FIG. 1. Typically, the laser is mode locked at 500 megapulses per second and the $\lambda 0.53$ micrometer radiation is used for high data rate intelligence information and the $\lambda 1.06$ micrometer radiation is used for the beacon for a distant receiver. In this particular embodiment of the invention the Nd:YAG laser rod 11 is end-pumped by solar pump energy 12 to provide stimulated emission. It is to be understood that sun-pumping is not a requirement of the system, and that lamp or other pumping excitation may be used equally well to provide the stimulated emission. It is also not required that the lasing element 11 be a Nd:YAG rod. The flat mirror 13 is highly reflective to the energy of the laser operating frequency and is, in general, for thermal stability, transparent to the solar pump radiation. Typical sun-pumped laser systems are disclosed in U.S. Pat. No. 3,786,370 to patentees Barry et al. In this particular embodiment being described in detail, the Nd:YAG laser rod 11 is approximately 4 mm in diameter and approximately 66 mm long although other dimensions may be used. Mirror 13 is positioned approximately 3.3 cm from the end of the laser rod. Lens 14 is used to collimate the circulating $\lambda 1.06\mu$ light through the laser rod and to focus the light approximately into the $Ba_2Na(NbO_3)_5$ frequency doubling crystal 15 for optimum frequency doubling. In this particular embodiment the lens 14 has a focal length of approximately 12 cm. It is spaced approximately 1.55 cm from the end of laser rod element 11. The concave low frequency output mirror 16 has a radius of curvature of approximately two centimeters and is spaced approximately 1.19 cm from the frequency doubling crystal 15. It is coated to be highly reflective to radiation having a wavelength of 0.53 micrometer and partially transmissive to radiation of 1.06 micrometers wavelength. The high freqency output mirror 17 is a flat mirror positioned at 45° to the put mirror beams. It is highly reflective to radiation at a wavelength of 1.06 micrometers and it is highly transmissive to radiation at a wavelength of 0.53 micrometer.

The beam path of the circulating 1.06 micrometers wavelength beam 10 is from the mirror 13 to mirror 17, reflecting and changing direction at mirror 17, to mirror 16, reflecting back to mirror 17 and back to mirror 13, and repeating. The optical cavity of the system is composed of two arms $L_1$ and $L_2$ at right angles to each other. The resonant cavity for the beam path at the low frequency $\lambda 1.06$ micrometers radiation lies between mirrors 13 and 16 encompassing both arms of the cavity. The $L_2$ arm contains the frequency doubling crystal 15. The frequency doubled 0.53 micrometer wavelength beam 9 is generated in the $Ba_2Na(NbO_3)_5$ crystal by the $\lambda 1.06$ micrometers radiation. The $\lambda 0.53$ micrometer radiation beam is coincident with the $\lambda 1.06$ micrometers radiation beam between mirrors 16 and 17 in the $L_2$ arm of the optical system. The $\lambda 1.06$ micrometers radiation generates the $\lambda 0.53$ micrometer light by a non-linear effect in the frequency doubling $Ba_2Na(NbO_3)_5$ crystal 15. Such second harmonic generating crystals are well known. They are described in U.S. Pat. No. 3,548,199 to patentees J. E. Geusic et al., U.S. Pat. No. 3,648,193 to patentees Foster et al., and U.S. Pat. No. 3,628,044 to patentees Yound et al.

Starting with the $\lambda 1.06$ micrometers light from mirror 17 going to mirror 16, $\lambda 0.53$ micrometer light 9 is generated in the crystal 15 and proceeds to mirror 16 as does the $\lambda 1.06$ micrometers light 10. Both wavelengths are reflected at mirror 16. Mirror 16 is made substantially totally reflective to $\lambda 0.53$ micrometer energy, and not quite totally reflective at $\lambda 1.06$ micrometers. Thus, it is made to be slightly transparent to $\lambda 1.06$ micrometers so that some $\lambda 1.06$ micrometers light radiation 10 passes through the low frequency output mirror 16 forming beam 18 which propagates to the associated directing and control elements constituting the beacon laser beam and directed to receiver equipment remote to the satellite. The effect that various degrees of transparency of mirror 16 to $\lambda 1.06$ micrometers radiation have on the output powers of both wavelengths will be discussed below.

The λ0.53 and λ1.06 micrometers light reflections off mirror 16 return through the frequency doubling crystal 15 where more λ0.53 micrometer light is generated. It is added to the λ0.53 micrometer light present (from previous generation), and both wavelengths then continue toward mirror 17. It has been found that the separation distance between the frequency doubling crystal 15 and the low frequency mirror 16 often is somewhat sensitive due to phase shift differences experienced by the two wavelengths in reflection from mirror 16. This phase difference is caused by the different reflection characteristics that the conventional dichroic coating on mirror 16 has on the different frequencies. This phase difference may cause a degradation of the optimum amount of frequency doubling since the wave phases in the crystal may not add in the optimum manner. In practicing the disclosed invention it may frequently be desirable to empirically fine-adjust the effective separation distance between the frequency doubling crystal 15 and the mirror 16. One way frequently used to effectively fine-adjust the spacing is by slightly changing the gas pressure contained in the optical cavity. Mirror 17 is made highly reflective to λ1.06 micrometers radiation, and highly transmissive to λ0.53 micrometer radiation. The majority of the λ0.53 micrometer light impinging on mirror 17 passes through it and escapes the cavity, to provide the 0.53 micrometer wavelength laser beam 19 for carrying the high data rate information impressed upon it from nearby intelligence coding equipment.

In the particular embodiment being described in detail the Nd:YAG laser rod 11 has, typically, a thermally induced effective focal length of about 140.0 cm. (This may vary depending upon the optical pumping manner used.) The frequency doubling crystal 15 has, typically, a thermally induced effective focal length of −87.7 cm (this may also vary depending upon its absorption of incident laser radiation). In this embodiment the path length from lens 14 via mirror 17 to the frequency doubling crystal is approximately 11.04 cm.

The amount of continuous wave λ0.53 and λ1.06 micrometers light which may be extracted from the laser has been found to be governed by the following, single pass parameter, equations;

$$\tau \frac{dI}{dt} = (G - \alpha - \epsilon I)I$$

$$\tau \frac{dG}{2dt} = -(\beta I + 1)G + G_o$$

where $\alpha$ is the total passive optical losses in the cavity to the circulating fundamental frequency (such as absorptions, mirror transmissions, and reflection imperfections); $\beta$ is the saturation parameter equal to the inverse of the optical intensity which causes the population inversion to decrease to one-half its initial value; $G$ is the saturated gain, proportional to the population inversion of the Nd atoms in the laser rod when the perturbing optical signal is present; $G_o$ is the unsaturated gain, i.e., the small signal gain which exists in the absence of an incident perturbing optical signal $I$ is the intensity of the circulating λ1.06 micrometers power; $\tau$ is the single direction mirror-to-mirror cavity time in seconds and equal to $L/C$ where $L$ is the effective cavity optical length and $C$ is the velocity of light; $\tau_2$ is the lifetime of the upper laser level; and $\epsilon$ is the λ1.06 micrometers to λ0.53 micrometer conversion parameter for the frequency doubling, thus, the generated frequency double power $P_G$ may be expressed $P_G = 2\epsilon I^2$. Considering the previous equations it may be seen that the steady state circulating power $I$ may be expressed as:

$$I = \frac{1}{2}\left(\frac{\alpha}{\epsilon} + \frac{1}{\beta}\right)\left[\left[1 + \frac{4\epsilon\beta(G_o - \alpha)}{(\alpha\beta + \epsilon)^2}\right]^{1/2} - 1\right]$$

As previously stated, $\alpha$ represents the total passive cavity losses; it is considered to be composed of not only the normal passive losses, reflective losses, absorptive losses, etc., but also includes the output energy transmission 18 through the mirror 16, which is an effective loss of power to that λ1.06 micrometer power circulating in the system. It does not include $\alpha$SHG, the second harmonic generation loss. Thus, if the transmissibility factor of λ1.06 micrometers radiation through mirror 16 is T, and $\alpha_o$ represents all the passive losses exclusive of mirror transmissions, $\alpha$ may be expressed $\alpha = \alpha_o + (T/2)$, and the λ1.06 micrometer power $P_o$ extracted from the laser is given by $P_o = TI$. The second harmonic generation loss, $\alpha$SHG, is equal to $\epsilon I$. It is considered a loss in that it is power removed from the steady state circulating power at λ1.06 micrometers.

Generally, the frequency doubling crystal 15 is also operated as a mode locking crystal. It has been found that the available powers in a mode-locked system generally approach approximately 0.9 of that of an unmode-locked continuous wave system due to the additional losses incurred. In the typical embodiment of the invention being described in detail, typical values of the parameters $\alpha$, (the passive cavity losses); $G_o$ (the unsaturated gain); and $\beta$ (the saturation parameter) are:

$$\alpha = 0.010, G_o = 0.035, \text{ and } \beta = 0.047.$$

Figure 2:
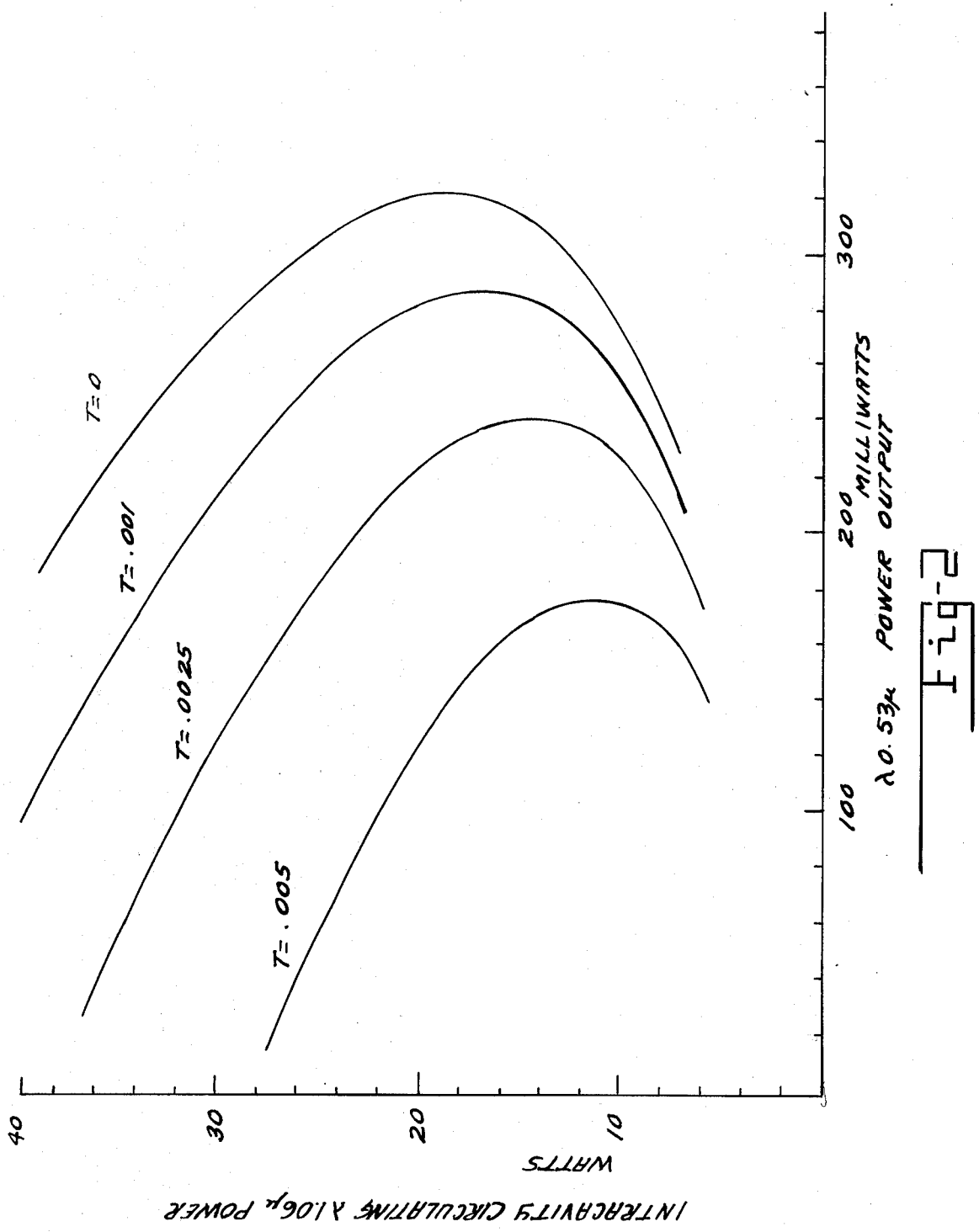
FIG. 2 is a representative plot showing the relationships of the output power at the higher frequency with respect to the intracavity circulating low frequency power for representative values of transmission of the low frequency output mirror.
Figure 7:
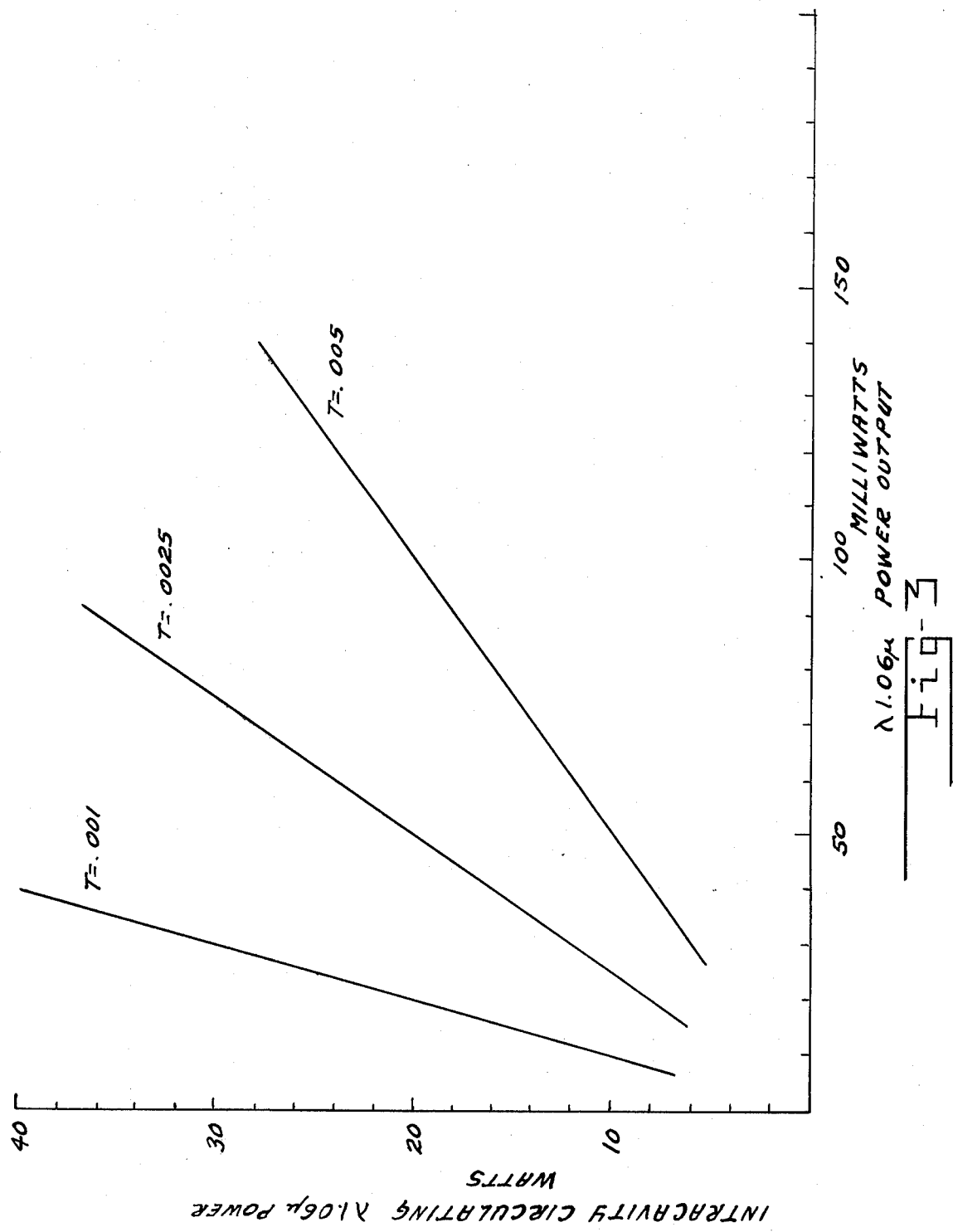

FIG. 2 graphically illustrates the relationships of the second harmonic λ0.53 micrometer power output of this typical embodiment, in milliwatts with respect to the intracavity circulating λ1.06 micrometers power in watts in the system for various values of transmission, T, of the λ1.06 micrometers energy through mirror 16. FIG. 3 shows the relationships of the λ1.06 micrometer power output in milliwatts with respect to the watts of intracavity cirulating λ1.06 micrometers power with different transmissibilities T of the low frequency output mirror 16. Obviously, the $T = O$ curve would provide zero λ1.06 micrometer power output and fall on the y-axis. FIG. 4 is a plot showing the relationships between the λ0.53 micrometer power output and the λ1.06 micrometers power output from the embodiment with various transmissibilities, T, of mirror 16.

The foregoing parameters and data are representative for a typical solar pumped laser embodiment of the invention. It is to be observed in the disclosed invention that the optimum amount of second harmonic λ0.53 micrometer power which may be extracted for any value of T occurs when $\epsilon = \alpha\beta$. Of course, the most λ0.53μ power extracted occurs when $T = O$ and $\epsilon = \alpha\beta$, obviously at this condition no λ1.06μ power is extracted. Referring to the curves of FIG. 4, for each value of transmission T of mirror 16 the optimum amount of λ0.53 micrometer power occurs when $\epsilon = \alpha\beta$, which is represented by the parameters existing at the points of the curves. Thus, in this embodiment, when a mirror 16 having a transmissibility of 0.001 is used, the peak $\lambda 0.53\mu$ power occurs at point 41. This particular embodiment then thus provides approximately 285 milliwatts of $\lambda 0.53\mu$ power output and approximately 20 milliwatts of $\lambda 1.06\mu$ power output. The optimum amount of $\lambda 0.53\mu$ power output for a mirror 16 having a T of 0.0025 occurs at point 42, and at point 45 for a $T=0.005$ mirror. Generally, in designing embodiments of the invention, the desired values of the high frequency power output and low frequency power output are known. It is then desirable to choose the transmissibility of the low frequency output mirror 16 such that the required powers at each wavelength is achieved and the product of the cavity losses and the saturation parameter of the laser places the operating point of the system at that point on the response curve such that $\epsilon = \alpha\beta$.

In a typical embodiment of the invention positioned in a satellite the $\lambda 1.06$ micrometers light 18 is emitted from mirror 16 along the $L_2$ optical axis, as diagrammed in FIG. 1, and the $\lambda 0.53$ micrometer light is emitted from mirror 17 also along the $L_2$ axis but in an opposite direction from the $\lambda 1.06\mu$ light. Typically, the $\lambda 0.53$ micrometer light beam 19 is transferred by an optical system to a conventional high data rate modulator where the data to be transmitted is imposed on the beam. The $\lambda 0.53$ micrometer light is then further transferred through a conventional optical pointing and tracking subsystem to a telescope where it is directed and transmitted to a distant receiver. Such optical systems are well known. The $\lambda 1.06$ micrometers light 18 is directed to another optical system where it is directed through a low data rate modulator, through pointing optics, through a telescope and transmitted to a different distant receiver and provides the acquisition beacon for the system.

We claim:

1. A dual function laser system providing a first laser beam radiation at a first wavelength and a second laser beam radiation radiating in the opposite direction from the said first beam and at a second wavelength that is approximately one-half the said first wavelength, comprising:
  a. an optical cavity resonant at the said first wavelength having a first leg, and an intersecting second leg positioned substantially at a right angle to the said first leg, the said optical cavity having a flat mirror highly reflective to the said first wavelength and highly transmissive to the said radiation of the said second wavelength positioned at approximately 45° to each of the said legs at their said intersection, the said flat mirror optically connecting the said first leg and the said second leg to form the said resonant cavity;
  b. a laser rod element positioned in the said first leg of the said optical cavity, stimulated to provide laser emission circulating in the said resonant cavity at the said first wavelength;
  c. a frequency doubling crystal positioned in the said second leg of the said optical cavity intercepting the said circulating laser emission at the said first wavelength, the said crystal generating from the said circulating emission the said second laser beam having the said second wavelength that is half the said first wavelength, whereby the said second laser beam is coincident with the said first laser emission in the said second leg of the said optical cavity and propogates through the said flat mirror; and
  d. means for extracting from the said second leg of the said optical cavity laser radiation at the said first wavelength propogating in the opposite direction from the said propogating second wavelength radiation.

* * * * *

UNITED STATES PATENT AND TRADEMARK OFFICE
CERTIFICATE OF CORRECTION

PATENT NO. : 3,975,693

DATED : August 17, 1976

INVENTOR(S) : James D. Barry and Paul M. Freedman

It is certified that error appears in the above-identified patent and that said Letters Patent are hereby corrected as shown below:

Col. 2, line 13, change "approximately" to -- appropriately --.

Signed and Sealed this

Sixteenth Day of November 1976

[SEAL]

Attest:

RUTH C. MASON
*Attesting Officer*

C. MARSHALL DANN
*Commissioner of Patents and Trademarks*